(12) United States Patent
Jeong et al.

(10) Patent No.: US 8,905,617 B2
(45) Date of Patent: Dec. 9, 2014

(54) DISPLAY APPARATUS

(75) Inventors: Wee Joon Jeong, Seoul (KR); Byung Jin Kim, Incheon (KR)

(73) Assignee: Samsung Display Co., Ltd. (KR)

( * ) Notice: Subject to any disclaimer, the term of this patent is extended or adjusted under 35 U.S.C. 154(b) by 179 days.

(21) Appl. No.: 13/471,823

(22) Filed: May 15, 2012

(65) Prior Publication Data

US 2013/0155717 A1    Jun. 20, 2013

(30) Foreign Application Priority Data

Dec. 16, 2011    (KR) ........................ 10-2011-0136466

(51) Int. Cl.
*F21V 8/00* (2006.01)
*B23P 11/00* (2006.01)
*G09F 13/04* (2006.01)

(52) U.S. Cl.
USPC ........... 362/633; 362/632; 362/634; 362/97.1

(58) Field of Classification Search
CPC .............. G02F 1/133308; G02F 2001/133314; G02F 2001/133317
USPC ........................................ 362/97.1, 632–634
See application file for complete search history.

(56) References Cited

U.S. PATENT DOCUMENTS

| | | | |
|---|---|---|---|
| 6,166,788 A | 12/2000 | Ha et al. | |
| 6,411,352 B1 | 6/2002 | Kim | |
| 6,854,856 B2 * | 2/2005 | Shin et al. | 362/613 |
| 7,864,263 B2 | 1/2011 | Kim | |
| 2003/0223020 A1 * | 12/2003 | Lee | 349/58 |
| 2009/0153766 A1 | 6/2009 | Lee et al. | |

FOREIGN PATENT DOCUMENTS

| | | |
|---|---|---|
| JP | 2001091947 A | 4/2001 |
| JP | 2009212436 A | 9/2009 |
| JP | 2011109506 A | 6/2011 |
| KR | 1020000042167 A | 7/2000 |
| KR | 1020020000353 A | 1/2002 |
| KR | 1020020009330 A | 2/2002 |
| KR | 1020030058189 A | 7/2003 |
| KR | 1020070073117 A | 7/2007 |
| KR | 1020100073661 A | 7/2010 |

\* cited by examiner

*Primary Examiner* — Stephen F Husar
*Assistant Examiner* — James Cranson, Jr.
(74) *Attorney, Agent, or Firm* — Cantor Colburn LLP

(57) ABSTRACT

A display apparatus includes a display panel, a backlight unit, a mold frame, a bottom bracket, a top mold, and first and second coupling members. The display panel includes a display surface on which an image is displayed. The backlight unit generates and provides a light to the display panel. The mold frame supports the display panel and the backlight unit. The bottom bracket accommodates the display panel, the backlight unit and the mold frame. The top mold faces the bottom bracket and overlaps a portion of the display panel, and the display panel is between the top mold and the bottom bracket. The first coupling member couples the mold frame with the top mold, and the second coupling member couples the top mold with the bottom bracket.

16 Claims, 4 Drawing Sheets

DISPLAY APPARATUS

This application claims priority to Korean Patent Application No. 10-2011-0136466 filed on Dec. 16, 2011, and all the benefits accruing therefrom under 35 U.S.C. §119, the contents of which are herein incorporated by reference in its entirety.

BACKGROUND OF THE INVENTION

1. Field of the Invention

The invention relates to a display apparatus capable of displaying an image.

2. Description of the Related Art

A display apparatus, such as a liquid crystal display or an electrophoretic display, includes a liquid crystal display panel or an electrophoretic display panel as a display panel on which an image is displayed. However, since the display panel, such as the liquid crystal display panel or the electrophoretic display panel, is not a self-emissive device, the display apparatus needs a backlight unit to provide a light to the display panel.

It is desirable to assemble the display apparatus including the display panel in a simple and low cost manner. It is also desirable to firmly retain the display panel and other components of the display apparatus in their assembled positions after assembly into the display apparatus.

The display apparatus may include a receiving member which accommodates the display panel and the backlight unit therein. Since it is desirable for the display apparatus to have a minimal overall weight and thickness, the receiving member should have various properties, such as a thin thickness, be simply assembled and/or disassembled, and protect the display panel and the backlight unit accommodated therein.

BRIEF SUMMARY OF THE INVENTION

Exemplary embodiments of the invention provide a display apparatus achieving improvement in assembly thereof, and having properties of slimness and lightweight.

According to exemplary embodiments, a display apparatus includes a display panel, a backlight unit, a mold frame, a bottom bracket, a top mold, a first coupling member and a second coupling member.

The display panel includes a display surface on which an image is displayed. The backlight unit provides a light to the display panel. The mold frame supports the display panel and the backlight unit. The bottom bracket accommodates the display panel, the backlight unit and the mold frame. The top mold faces the bottom bracket and overlaps a portion of the display panel, and the display panel is between the top mold and the bottom bracket.

The first coupling member couples the mold frame with the top mold, and the second coupling member couples the top mold with the bottom bracket. Each of the first coupling member and the second coupling member may have a snap-fit shape.

The first coupling member and the second coupling member may include catching members, a protrusion and/or an insertion hole directly thereon.

The display panel has a rectangular shape and the mold frame corresponds to three sides of the display panel excluding a fourth side of the display panel. An inner area of the mold frame is exposed at the fourth side of the display panel such that the light guide plate and the optical sheet are disposed in the inner area from the fourth side and along a direction substantially parallel to two opposing sides of the mold frame which face each other, and are coupled with the mold frame.

According to the above, elements of the display apparatus may be assembled with and fixed to each other without employing separate coupling members or fixing members. Thus, cost and time in assembly of the display apparatus may be reduced. In addition, since separate coupling members or fixing members are not employed, the display apparatus has a light weight and a reduced overall thickness.

BRIEF DESCRIPTION OF THE DRAWINGS

The above and other advantages of the invention will become readily apparent by reference to the following detailed description when considered in conjunction with the accompanying drawings wherein.

DETAILED DESCRIPTION OF THE INVENTION

Figure 1:
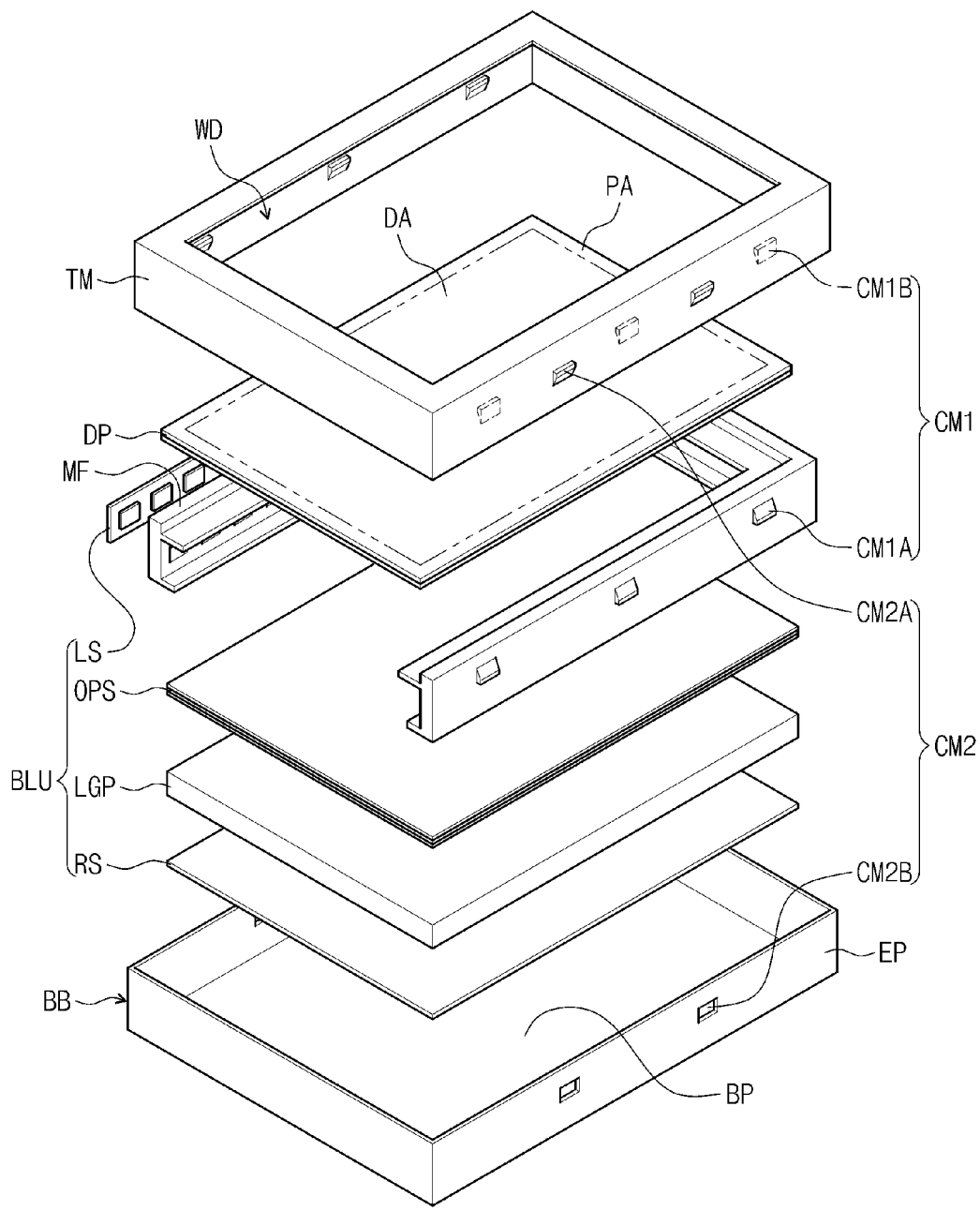
FIG. 1 is an exploded perspective view showing an exemplary embodiment of a display apparatus according to the invention.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "under," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "lower" relative to other elements or features would then be oriented "above or "upper" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be explained in detail with reference to the accompanying drawings.

Figure 2:
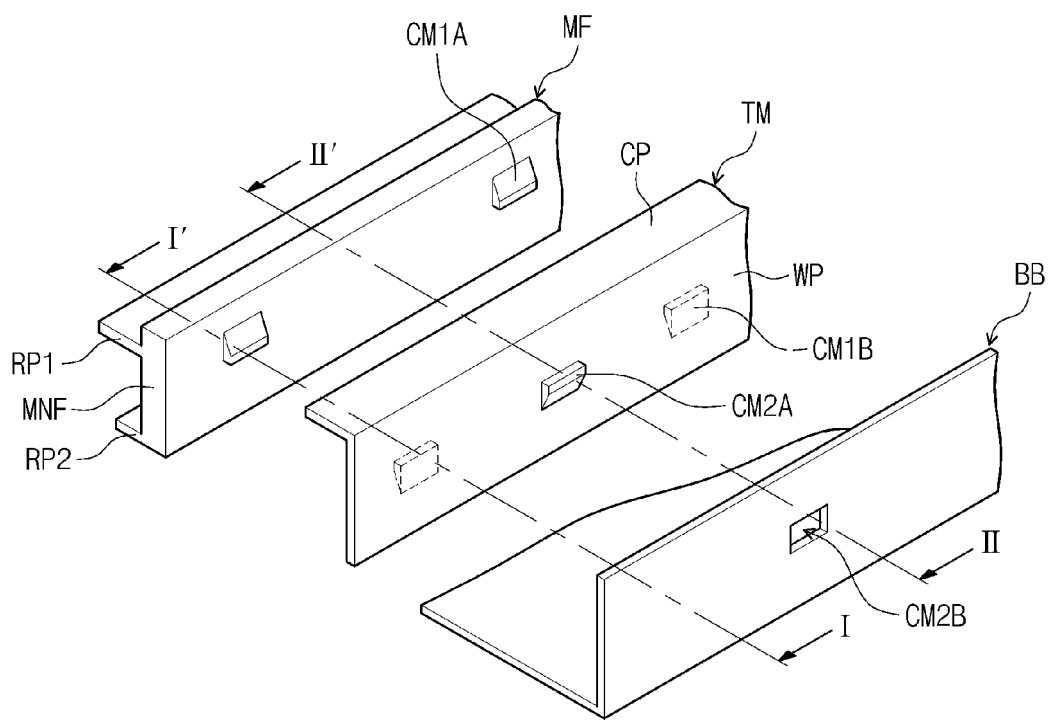
FIG. 2 is an exploded perspective view showing portions of a mold frame, a top mold and a bottom bracket shown in FIG. 1.
Figure 3:
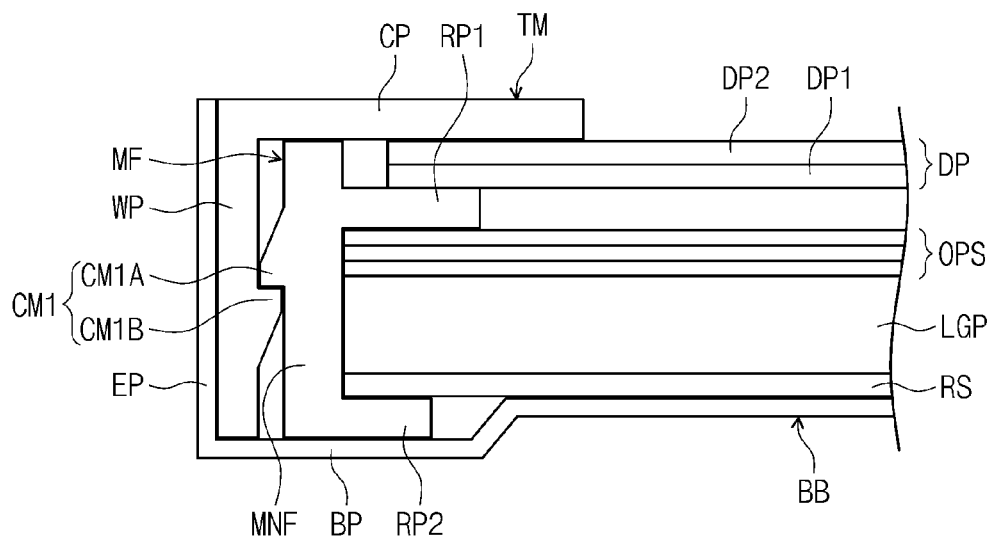
FIG. 3 is a cross-sectional view showing the display apparatus shown in FIG. 1 corresponding to line I-I' shown in FIG. 2.
Figure 4:
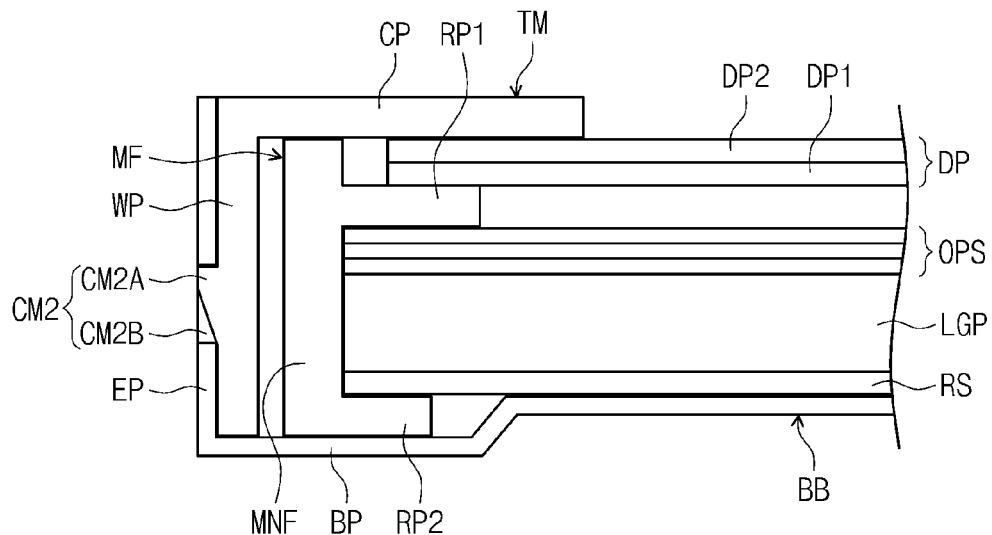
FIG. 4 is a cross-sectional view showing the display apparatus shown in FIG. 1 corresponding to line II-II' shown in FIG. 2.

FIG. 1 is an exploded perspective view showing an exemplary embodiment of a display apparatus according to the present invention, FIG. 2 is an exploded perspective view showing portions of a mold frame, a top mold and a bottom bracket shown in FIG. 1, FIG. 3 is a cross-sectional view showing the display apparatus shown in FIG. 1 corresponding to line I-I' shown in FIG. 2, and FIG. 4 is a cross-sectional view showing the display apparatus shown in FIG. 1 corresponding to line II-IF shown in FIG. 2.

Referring to FIGS. 1 to 4, the display apparatus includes a display panel DP, a mold frame MF, a backlight unit BLU, a bottom bracket BB and a top mold TM.

The display panel DP displays an image. As the display panel DP, a light receiving type display panel, such as a liquid crystal display panel, an electrophoretic display panel, etc., may be employed.

The display panel DP includes a first substrate DP1, a second substrate DP2 facing the first substrate DP1, and a liquid crystal layer (not shown) interposed between the first substrate DP1 and the second substrate DP2. The display panel DP has a rectangular plate shape in a plan view, and includes long sides parallel to each other and short sides parallel to each other.

The display panel DP includes a display surface on which the image is displayed, a rear surface opposite to the display surface, and a side surface connecting the display surface and the rear surface to each other. In the display apparatus shown in FIG. 1, the display surface indicates an upper surface of the display panel DP. The display surface includes a display area DA in which the image is displayed, and a peripheral area PA surrounding the display area DA.

According to the exemplary embodiment, the first substrate DP1 includes a plurality of pixel electrodes (not shown), and a plurality of thin film transistors (not shown) electrically connected to the pixel electrodes in one-to-one correspondence. Each thin film transistor switches a driving signal applied to a corresponding pixel electrode of the pixel electrodes. In addition, the second substrate DP2 includes a common electrode (not shown) that forms an electric field in cooperation with the pixel electrodes to control an arrangement of liquid crystal molecules in the liquid crystal layer. The display panel DP drives the liquid crystal molecules to project the image to a front direction at a viewing side of the display apparatus.

The backlight unit BLU is disposed under the display panel DP to supply the light to the display panel DP. The backlight unit BLU includes a light source part LS generating and emitting the light, a light guide plate LGP guiding the light to the display panel DP, an optical sheet OPS improving the efficiency of the light and a reflective sheet RS.

The light source part LS is disposed adjacent to one or two sides, or more sides of the display panel DP. Although not shown in figures, the light source part LS may be disposed adjacent to all sides of the display panel DP. In addition, the light source part LS may be disposed adjacent to at least one corner of the display panel DP. In the exemplary embodiment, the light source part LS is disposed corresponding to one of the two long sides of the display panel DP.

The light source part LS includes a light source generating and emitting the light, and a supporter supporting the light source disposed thereon. In an exemplary embodiment, for example, the supporter may be a printed circuit board on which wires are printed to apply a power supply voltage to the light source. The supporter has a rectangular plate shape having a longitudinal axis extended in a predetermined direction. The light source may be a point light source, a line light source, or a surface light source, but the exemplary embodiment should not be limited thereto or thereby. In the exemplary embodiment, a light emitting diode ("LED"), which is the point light source, will be described as the light source as a representative example. The LED is provided in a plural number and the LEDs are arranged on the printed circuit board in a linear arrangement.

The light guide plate LGP has a plate-like shape and is disposed under and overlapping the display panel DP.

The light guide plate LGP guides the light provided from the light source part LS to the display panel DP.

The optical sheet OPS is disposed between the light guide plate LGP and the display panel DP. The optical sheet OPS controls the light provided from the light source. The optical sheet OPS may include, but is not limited to, a diffusion sheet, a prism sheet and a protective sheet, which are sequentially stacked on the light guide plate LGP. The diffusion sheet diffuses the light. The prism sheet condenses the light diffused by the diffusion sheet in a direction vertical (e.g., perpendicular) to the front surface of the display panel DP. The light passing through the prism sheet is substantially vertically incident to the display panel DP. The protective sheet is disposed on the prism sheet and faces the display panel DP, and protects the prism sheet from external impacts. In the exemplary embodiment, each of the diffusion sheet, the prism sheet and the protective sheet is provided in a singular number, but the exemplary embodiment should not be limited to any number. That is, at least one of the diffusion sheet, the prism sheet or the protective sheet may be provided in a plural number, or one of the diffusion sheet, the prism sheet and the protective sheet may be omitted.

The reflective sheet RS is disposed under and overlapping the light guide plate LGP. The reflective sheet RS reflects the light leaked from the light guide plate LGP and away from the display panel DP such that the leaked light is redirected and travels toward the display panel DP. To this end, the reflective sheet RS includes a light reflective material. The reflective sheet RS is disposed on the bottom bracket BB to reflect the light. As a result, an amount of the light provided to the display panel DP may be enhanced.

The mold frame MF is provided along an end portion of the display panel DP and facing side surfaces of the display panel DP, and is disposed under the display panel DP to support the display panel DP. The mold frame MF is provided to correspond to at least a portion of four sides of the display panel DP. In an exemplary embodiment, for instance, the mold frame MF may have a rectangular ring shape corresponding to the four sides of the display panel DP, or a U-shape in the plan view of the display apparatus corresponding to three sides of the four sides of the display panel DP. In the exemplary embodiment, the mold frame MF having the U-shape will be described as a representative example, but the shape of the mold frame MF should not be limited to the U-shape.

The mold frame MF may an integral member of a single, unitary, indivisible structure or may include individual members assembled after being themselves being formed separately. Although not shown in figures, in the case that the mold frame MF includes plural parts or members, a first mold frame having the U-shape of which a portion corresponding to one side of the display panel DP is opened and a second mold frame corresponding to the one side of the display panel DP are provided. The opened portion of the first mold frame exposes an inner area of the mold frame MF. Thus, the first U-shape mold frame and the second mold frame are assembled with each other, thereby providing the mold frame having the rectangular ring shape corresponding to the four sides of the display panel DP.

The mold frame MF includes a main frame MNF facing the side surface of the display panel DP, a first mounting portion RP1 protruded from the main frame MNF in a direction substantially parallel to the rear surface of the display panel DP, and a second mounting portion RP2 separated from the first mounting portion RP1 and protruded from the main frame MNF in a direction substantially parallel to the rear surface of the display panel DP. The display panel DP is mounted on and may contact the first mounting portion RP1, and thus the first mounting portion RP1 supports the display panel DP.

The optical sheet OPS, the light guide plate LGP and the reflective plate RS are mounted on the second mounting portion RP2. The optical sheet OPS, the light guide plate LGP and the reflective plate RS are partially inserted into a space between the first mounting portion RP1 and the second mounting portion RP2. End portions of the optical sheet OPS, the light guide plate LGP and the reflective plate RS are in the space between the first mounting portion RP1 and the second mounting portion RP2, and thus are partially inserted into the space. The first and second mounting portions RP1 and RP2 may be provided at positions corresponding to portions of the display panel DP.

In the mold frame MF, a portion of the main frame MNF at the side to which the light source part LS is provided may have an opening. The light source is disposed corresponding to the opening, and the light generated and emitted from the light source is provided to the light guide plate LGP through the opening.

The mold frame MF may include an organic material, such as polymer resin, but the exemplary embodiment should not be limited to the organic material.

The top mold TM faces a front of the display panel DP and supports end portions of the display panel DP. The top mold TM covers (e.g., overlaps) a portion of the display surface of the display panel DP. In addition, the top mold TM may cover the side surface of the display panel, an outer side surface of the mold frame MF and/or a side surface of the bottom bracket BB.

In the exemplary embodiment, the top mold TM may include a cover portion CP that covers the peripheral area PA of the display panel DP, and a sidewall portion WP extended from the cover portion CP downward and substantially perpendicular to the cover portion CP. The cover portion CP is substantially parallel to the display surface of the display panel DP. The cover portion CP covers the peripheral area PA and include a display window WD extended therethrough and exposes the display area DA of the display panel DP. The sidewall portion WP may cover (e.g., overlap) the side surface of the display panel DP, the side surface of the mold frame MF and/or the side surface of the bottom bracket BB. The sidewall portion WP shown in FIG. 1 covers the outer side surface of the main frame MNF.

The top mold TM may include an organic material, such as a polymer resin. Since the polymer resin has elasticity, the top mold TM resists impacts. However, the material for the top mold TM should not be limited thereto or thereby, and thus the top mold TM may include a metal material.

The top mold TM supports the display panel DP in cooperation with the mold frame MF by using a first coupling member CM1. The first coupling member CM1 will be described in detail with reference to FIGS. 2 to 4.

The bottom bracket BB is disposed to face the top mold TM while interposing the display panel DP therebetween. The bottom bracket BB is disposed under the backlight unit BLU to accommodate the display panel DP, the mold frame MF and the backlight unit BLU therein.

The bottom bracket BB includes a bottom portion BP disposed under the reflective sheet RS, and an extension portion EP extended upward and substantially perpendicular from the bottom portion BP. The display panel DP, the mold frame MF and the backlight unit BLU are accommodated into a space defined by the bottom portion BP and the extension portion EP. The extension portion EP may cover (e.g., overlap) an outer side surface of the top mold TM.

The bottom bracket BB supports the display panel DP and the backlight unit BLU in cooperation with the top mold TM by using a second coupling member CM2. The second coupling member will be described in detail with reference to FIGS. 2 to 4.

The bottom bracket BB may include a metal material such as aluminum, but the exemplary embodiment should not be limited to the metal material. That is, the bottom bracket BB may include an organic material, such as polymer resin.

FIG. 2 is an exploded perspective view showing portions of a mold frame MF, a top mold TM and a bottom bracket BB shown in FIG. 1, FIG. 3 is a cross-sectional view showing the display apparatus shown in FIG. 1 corresponding a line I-I' shown in FIG. 2, and FIG. 4 is a cross-sectional view showing the display apparatus shown in FIG. 1 corresponding to line II-IF shown in FIG. 2.

Referring to FIGS. 1 to 4, the mold frame MF and the top mold TM are fixed to each other by the first coupling member CM1. The top mold TM and the bottom bracket BB are fixed to each other by the second coupling member CM2. The first coupling member CM1 and/or the second coupling member CM2 may be disposed at one or more sides of the display apparatus. In the exemplary embodiment, for example, the first and second coupling members CM1 and CM2 are at both of the long sides of the display panel DP and the display apparatus.

The first coupling member CM1 and the second coupling member CM2 have a snap-fit shape. The mold frame MF, the top mold TM and the bottom bracket BB have elasticity, and thus the frame MF, the top mold TM and the bottom bracket BB may be restored to an initial shape after being deformed from the initial shape. That is, the first and second coupling members CM1 and CM2 respectively utilize a snap-fit couple for the mold frame ME, the top mold TM and the bottom bracket BB.

According to the exemplary embodiment, the first coupling member CM1 includes catching members. In detail, the first coupling member CM1 includes a first catching member CM1A directly on the mold frame MF and a second catching member CM1B directly on the top mold TM. The first catching member CM1A, the main frame MNF, the first mounting portion RP1 and the second mounting portion RP2 may form a single, unitary, indivisible mold frame MF. The second catching member CM1B, the sidewall portion MF and the cover portion CP may form a single, unitary, indivisible top mold TM.

The first catching member CM1A is outwardly protruded from the outer surface of the main frame MNF of the mold frame MF. The second catching member CM1B is inwardly protruded from an inner surface of the sidewall portion WP of the top mold TM, and corresponds to and is aligned with the first catching member CM1A.

The first catching member CM1A includes an inclined surface inclined with respect to the outer surface of the main frame MNF, and a vertical surface extended from a distal end of the inclined surface and substantially perpendicular to the outer surface of the main frame MNF. The inclined surface of the first catching member CM1A inclines outwardly and further away from the outer surface of the main frame MNF in a downward direction towards the bottom portion BP of the bottom bracket BB.

The second catching member CM1B includes an inclined surface inclined with respect to the inner surface of the sidewall portion WP of the top mold TM, and a vertical surface extended from a distal end of the inclined surface and substantially perpendicular to the inner surface of the sidewall portion WP of the top mold TM. The inclined surface of the second catching member CM1B inclines outwardly and further from the inner surface of the sidewall portion WP in an upward direction towards the cover portion CP of the top mold TM. The inclined surfaces press the top mold TM downward to allow the top mold TM to be easily coupled with the mold frame MF.

As described above, when the first catching member CM1A of the mold frame MF is coupled with the second catching member CM1B of the top mold TM, the mold frame MF may be coupled with the top mold TM. In detail, when the top mold TM and the mold frame MF move in opposite directions to each other, the inclined surface of the first catching member CM1A slides along the inclined surface of the second catching member CM1B, the top mold TM and/or the mold frame MF are deformed, and thus the vertical surface of the first catching member CM1A makes contact with the vertical surface of the second catching member CM1B. As a result, the mold frame MF may be coupled with the top mold TM and form a portion of a receiving member which accommodates the display panel DP and the backlight unit BLU therein. The first catching member CM1A of the mold frame MF engaged with the second catching member CM1B of the top mold TM may solely couple the mold frame MF to the top mold TM.

Since the first catching member CM1A and the second catching member CM1B are engaged with each other when the vertical surfaces make contact with each other, the top mold TM and the mold frame MF may not be undesirably separated from each other. Additionally, since the top mold TM and/or the mold frame MF may be deformed, the first and second catching members CM1A and CM1B may be disengaged from each other, and the top mold TM can be separated from the mold frame MF if desired. That is, the top mold TM and the mold frame MF are detachably disposed with each other, such that the top mold TM and the mold frame MF can be combined with each other and separated from each other. Thus, the receiving member including the top mold TM coupled with the bottom bracket BB achieves a thin thickness, can be assembled in a simple manner and provides protection for both the display panel DP and the backlight unit BLU.

Thus, the mold frame MF and the top mold TM may be fixed to each other by the first catching member CM1A and the second catching member CM1B.

According to alternative exemplary embodiments, the positions of the first catching member CM1A and the second catching member CM1B may be varied. In one or more exemplary embodiment, for instance, the first catching member CM1A may be on the top mold TM and the second catching member CM1B may be on the mold frame MF.

According to the exemplary embodiment, the second coupling member CM2 includes a protrusion CM2A, and an insertion member CM2B into which the protrusion CM2A is inserted. In detail, the protrusion CM2A is directly on the top mold TM and the insertion member CM2B is directly in a portion of the bottom bracket BB. The protrusion CM2A, the second catching member CM1B, the sidewall portion WP and the cover portion CP may form a single, unitary, indivisible top mold TM. The insertion member CM2B may be an enclosed opening solely defined by the extension portion EP of the bottom bracket BB.

The protrusion CM2A is outwardly protruded from the outer surface of the sidewall portion WP of the top mold TM. The protrusion CM2A includes an inclined surface inclined with respect to the outer surface of the sidewall portion WP, and a vertical surface extended from a distal end of the inclined surface and substantially perpendicular to the outer surface of the sidewall portion WP. The inclined surface is further spaced apart from the outer surface of the sidewall portion WP of the top mold TM in a direction away from a lower portion of the sidewall portion WP of the top mold TM. The inclined surface allows the bottom bracket BB including the insertion member CM2B to be easily coupled with the top mold TM when the bottom bracket BB is pressed upward relative to the top mold TM and/or the top mold TM is pressed downward relative to the bottom bracket BB.

The insertion member CM2B may be a through hole extended completely through a thickness of the extension portion EP of the bottom bracket BB and corresponds to the protrusion CM2A, but the insertion member CM2B should not be limited to the through hole. That is, the insertion member CM2B may have a recess shape extended partially into a thickness of the extension portion EP but not completely therethrough. In the exemplary embodiment, the insertion member CM2B is formed by perforating the extension portion EP of the bottom bracket BB.

The protrusion CM2A has a protruded height taken perpendicular to the outer surface of the sidewall portion WP that is equal to or larger than a thickness of extension portion EP and/or the bottom bracket BB. The insertion member CM2B has dimensions in a plan view of the extension portion EP equal to or larger than dimensions of the protrusion CM2A in a plan view of the sidewall portion WP such that the protrusion CM2A is easily inserted in the insertion member CM2B. The top mold TM may be coupled with the bottom bracket BB by inserting the protrusion CM2A into the insertion member CM2B. In detail, when the top mold TM and the bottom bracket BB move in opposite directions relative to each other, the inner side surface of the bottom bracket BB slides along the inclined surface of the protrusion CM2A, the top mold TM and/or the bottom bracket BB are deformed, and thus the vertical surface of the protrusion CM2A makes contact with an inner surface of the extension portion EP which defines the insertion member CM2B. As a result, the top mold TM may be coupled with the bottom bracket BB and form a portion of a receiving member which accommodates the display panel DP and the backlight unit BLU therein.

Since the vertical surface of the protrusion CM2A is engaged with the inner surface of the insertion member CM2B after the top mold TM is coupled with the bottom bracket BB, the top mold TM and the mold frame MF may not be separated from each other. Additionally, since the top mold TM and/or the bottom bracket BB may be deformed, the protrusion CM2A and the insertion member CM2B may be disengaged from each other, and the top mold TM can be separated from the bottom bracket BB if desired. That is, the top mold TM and the bottom bracket BB are detachably disposed with each other, such that the top mold TM and the bottom bracket BB can be combined with each other and separated from each other. Thus, the receiving member including the top mold TM coupled with the bottom bracket BB achieves a thin thickness, can be assembled in a simple manner and provides protection for both the display panel DP and the backlight unit BLU. The protrusion CM2A engaged with the insertion member CM2B may solely couple the bottom bracket BB to the top mold TM.

In the exemplary embodiment, the insertion member CM2B has a rectangular planar shape, but the exemplary embodiment should not be limited to the rectangular shape. In one or more exemplary embodiment, for instance, the insertion member CM2B may have various planar shapes and sizes, e.g., a circular shape.

According to alternative exemplary embodiment, the positions of the protrusion CM2A and the insertion member CM2B may be changed. In one or more exemplary embodiment, for instance, the protrusion CM2A may be on the bottom bracket BB and the insertion member CM2B may be in the top mold TM.

In addition, the cross-sectional shape of the protrusion CM2A should not be limited to the inclined surface and the vertical surface. That is, the protrusion CM2A may have various cross-sectional shapes that may be coupled with the insertion member CM2B. In one or more embodiment, for instance, the protrusion CM2A may have a hook shape in a cross-section.

For the convenience of explanation, one first coupling member CM1 and one second coupling member CM2 have been described with respect to the exemplary embodiment, but the number of each of the first coupling member CM1 and the second coupling member CM2 should not be limited thereto or thereby. In other words, each of the first coupling member CM1 and the second coupling member CM2 may be provided in a plural number.

In addition, in the exemplary embodiment, the mold frame MF and the top mold TM are coupled with each other by the first coupling member CM1, and the top mold TM and the bottom bracket BB are coupled with each other by the second coupling member CM2, but the exemplary embodiment should not be limited thereto or thereby. That is, according to alternative exemplary embodiments, the mold frame MF and the top mold TM may be coupled with each other by the second coupling member CM2, and the top mold TM and the bottom bracket BB may be coupled with each other by the first coupling member CM1.

According to the exemplary embodiment, the top mold TM is directly adjacent to a portion of the outer surface of the mold frame MF, and the bottom bracket BB is directly adjacent to a portion of the outer surface of the top mold TM, with the top mold TM between the mold frame MF and the bottom bracket BB, but the exemplary embodiment should not be limited thereto or thereby. According to alternative exemplary embodiments, the bottom bracket BB may be directly adjacent to a portion of the outside surface of the mold frame MF and the top mold TM may be directly adjacent to a portion of the outer surface of the bottom bracket BB, with the bottom bracket BB between the mold frame MF and the top mold TM. In this case, the positions of the coupling members are changed with reference to each other.

Figure 5:
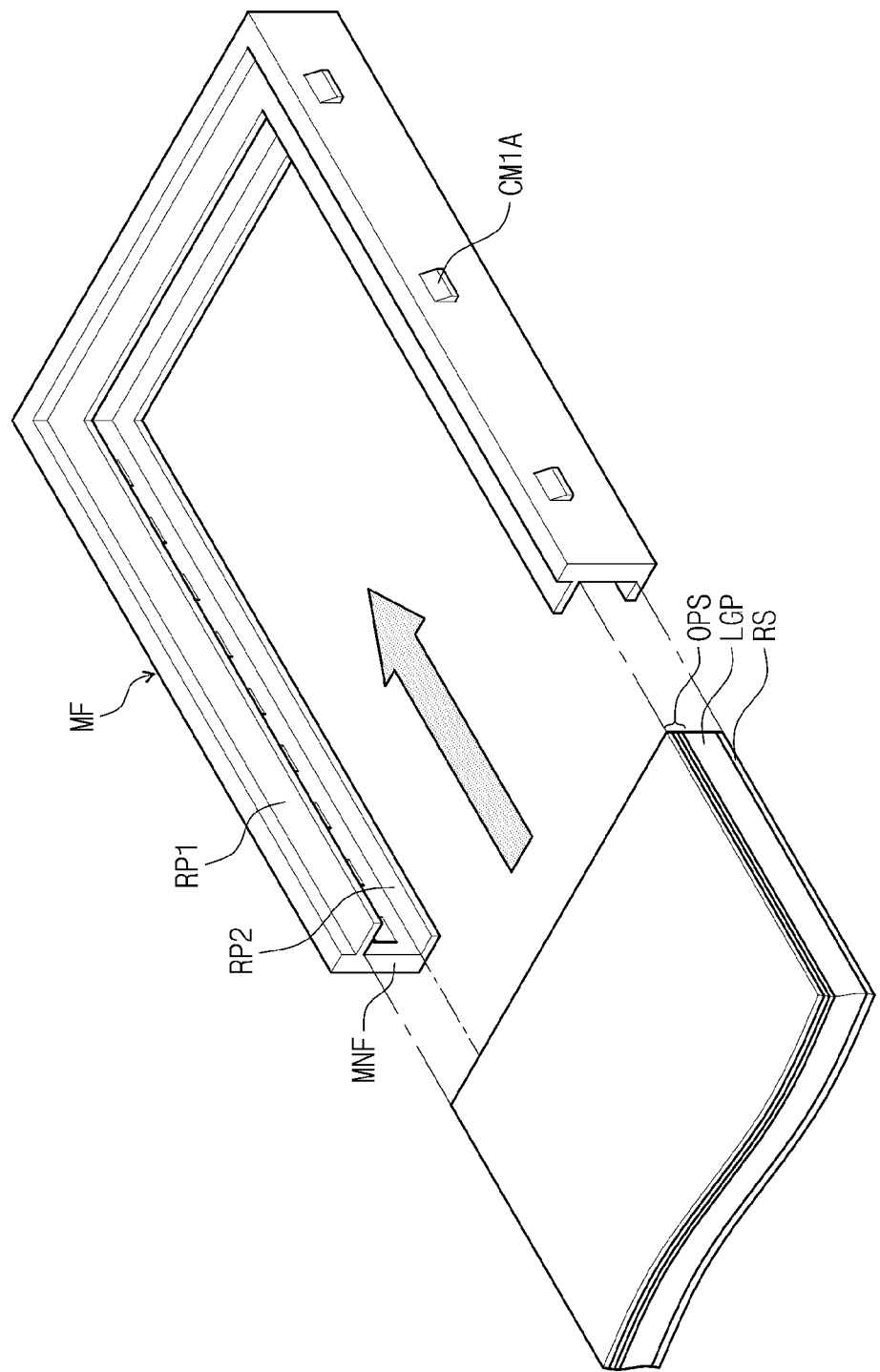
FIG. 5 is a perspective view showing an exemplary embodiment of a method of assembling a display apparatus according to the invention.

FIG. 5 is a perspective view showing an exemplary embodiment of a method of assembling a display apparatus according to the invention.

Referring to FIG. 5, the mold frame MF has the U-shape in the plan view of the display apparatus corresponding to three sides of the four sides of the display panel DP. The U-shape includes two long members at two long sides of the mold frame corresponding to two long sides of the display panel DP, and one short member connecting the two long members to each other, at one of the short sides of the display apparatus corresponding to one of the short sides of the display panel DP. The mold frame MF does not include a short member at the remaining short side of the display panel DP, and the mold frame is opened at the remaining short side of the display panel DP. At the remaining short side of the display panel DP, the space between the first mounting portion RP1 and the second mounting portion RP2 is exposed to the outside of the mold frame MF.

The optical sheet OPS may be disposed on the light guide plate LGP outside of the mold frame MF. The reflective sheet RS may be disposed under the light guide plate LGP outside of the mold frame MF. Alternatively, the optical sheet OPS, the light guide plate LGP and/or the reflective sheet RS may be disposed in the mold frame MF while one or more of the optical sheet OPS, the light guide plate LGP and the reflective sheet RS is already disposed within the mold frame MF. The optical sheet OPS, the light guide plate LGP and the reflective sheet RS are disposed through the opened end portion of the mold frame MF such as by sliding, and thus the optical sheet OPS, the light guide plate LGP and the reflective sheet RS are inserted between the first and second mounting portions RP1 and RP2 of the mold frame MF. The reflective sheet RS, the light guide plate LGP and the optical sheet OPS slide along a direction substantially parallel to the two long members of the mold frame MF, which face each other, as indicated by the arrow in FIG. 5. As a result, the optical sheet OPS, the light guide plate LGP and the reflective sheet RS are disposed between the first and second mounting portions RP1 and RP2 and fixed to the mold frame MF.

The reflective sheet RS is disposed under the light guide plate LGP and disposed between the first and second mounting portions RP1 and RP2 together with the optical sheet OPS and the light guide plate LGP, but the exemplary embodiment should not be limited thereto or thereby. In one or more exemplary embodiment, for instance, the optical sheet OPS and the light guide plate LGP may be disposed between the first and second mounting portions RP1 and RP2 of the mold frame MF, and the reflective sheet RS may be coupled with the top mold TM together with the bottom bracket BB after being disposed on the bottom bracket BB.

The light source is disposed at a position corresponding to the opening in the portion of the mold frame MF.

The display panel DP is disposed on the first mounting portion RP1 in a top-down manner.

The top mold TM is disposed on the display panel DP and pressed downward relative to the mold frame MF such that the top mold TM is coupled with the mold frame MF by the first coupling member CM1.

The bottom bracket BB is disposed under the reflective sheet RS and pressed upward relative to the top mold TM such that the bottom bracket BB is coupled with the top mold TM by the second coupling member CM2.

According to a conventional display apparatus, a separate coupling member or fixing member is required to assemble and fix elements of the display apparatus. However, according to one or more exemplary embodiment, elements of the display apparatus may be directly assembled with and fixed to each other without using a separate coupling member. Accordingly, cost and time for assembly of the display apparatus may be reduced.

In addition, according to the conventional display apparatus, a top chassis that covers a portion of the display panel and a top bracket that covers the top chassis are provided on the front of the display panel, and a bottom chassis that accommodates the light guide plate, the optical sheet and the reflective sheet and a bottom bracket that covers the bottom chassis are provided on the rear of the display panel.

Particularly, according to the conventional display apparatus, since the light guide plate, the optical sheet or the reflective sheet moves in the bottom chassis when the separate fixing member in not provided in the bottom chassis, sequentially stacking the light guide plate, the optical sheet and the reflective sheet may be difficult. However, according to one or more exemplary embodiment, the light guide plate, the optical sheet and the reflective sheet are stably coupled with the mold frame, thereby preventing the movement of the light guide plate, the optical sheet and the reflective sheet in the receiving member of the display apparatus.

According to the one or more exemplary embodiment, since the bottom bracket may serve as both the bottom chassis and the bottom bracket of the conventional display apparatus, the process of assembling the display apparatus may be simplified and the cost of manufacturing the display apparatus may be reduced. In addition, since the top chassis and the bottom chassis as described in the conventional display apparatus are omitted in the exemplary embodiment, an overall thickness of the display apparatus may be reduced.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
   a display panel including a display surface on which an image is displayed;
   a backlight unit which generates and provides a light to the display panel;
   a mold frame which supports the display panel and the backlight unit;
   a bottom bracket which accommodates the display panel, the backlight unit and the mold frame;
   a top mold which faces the bottom bracket and overlaps a portion of the display panel, wherein the display panel is between the top mold and the bottom bracket;
   a first coupling member which couples the mold frame with the top mold; and
   a second coupling member which couples the top mold with the bottom bracket, wherein the top mold defines:
   a protruded member of the first coupling member, extended inward toward the mold frame directly from the top mold, and in a first direction, and
   a protruded member of the second coupling member, extended outward toward the bottom bracket directly from the top mold, and in a second direction opposite to the first direction.

2. The display apparatus of claim 1, wherein each of the first coupling member and the second coupling member has a snap-fit shape.

3. The display apparatus of claim 2, wherein the first coupling member comprises:
   a first member directly on one of the mold frame and the top mold; and
   a second member directly on a remaining one of the mold frame and the top mold,
   wherein the first and second members engage with each other member and couple the mold frame with the top mold.

4. The display apparatus of claim 3, wherein the second coupling member comprises:
   a first protrusion directly on one of the top mold and the bottom bracket; and
   a first insertion member directly on a remaining one of the top mold and the bottom bracket,
   wherein the first protrusion and the first insertion member engage with each other and couple the top mold with the bottom bracket.

5. The display apparatus of claim 4, wherein
   the display surface of the display panel comprises a display area in which the image is displayed, and a peripheral area which surrounds the display area in a plan view of the display panel, and
   the mold frame overlaps a portion of the peripheral area in the plan view of the display panel.

6. The display apparatus of claim 5, wherein the top mold comprises:
   a cover portion which is substantially parallel to the display surface of the display panel and overlaps the peripheral area of the display surface; and
   a sidewall portion which extends substantially perpendicular from the cover portion and toward the bottom bracket,
   wherein one of the first member and the second member of the first coupling member, and one of the first protrusion and the first insertion member of the second coupling member are directly on the sidewall portion of the top mold.

7. The display apparatus of claim 5, wherein the bottom bracket comprises:

a bottom portion which is substantially parallel to a rear surface of the display panel and faces the rear surface; and an extension portion which extends from the bottom portion, wherein one of the first member of the first coupling member and the first insertion member of the second coupling member is directly on the extension portion of the bottom bracket.

8. The display apparatus of claim 2, wherein the first coupling member comprises:

a second protrusion directly on one of the mold frame and the top mold; and a second insertion member directly on a remaining one of the mold frame and the top mold, wherein the second protrusion is inserted into the second insertion member and couples the mold frame with the top mold.

9. The display apparatus of claim 8, wherein the second coupling member comprises:

a third member directly on one of the top mold and the bottom bracket; and a fourth member directly on a remaining one of the top mold and the bottom bracket, wherein the fourth member and the third member are engaged with each other and couple the top mold with the bottom bracket.

10. The display apparatus of claim 1, wherein the backlight unit comprises:

a light source which generates and provides the light to the display panel;

a light guide plate which guides the light to the display panel;

an optical sheet between the light guide plate and the display panel, wherein the optical sheet controls a direction in which the light travels.

11. The display apparatus of claim 10, wherein the display panel has a substantially rectangular shape, and the mold frame corresponds to three sides of the display panel excluding a fourth side of the display panel.

12. The display apparatus of claim 11, wherein an inner area of the mold frame is exposed at the fourth side of the display panel such that the light guide plate and the optical sheet are disposed in the inner area of the mold frame from the fourth side of the display panel along a direction substantially parallel to two opposing sides of the mold frame, and are coupled with the mold frame.

13. The display apparatus of claim 12, wherein the light source is adjacent to one of the opposing two sides of the mold frame.

14. The display apparatus of claim 1, wherein the top mold comprises a polymer resin.

15. The display apparatus of claim 1, wherein the bottom bracket comprises a metal material.

16. A receiving member of a display apparatus, comprising:

a frame member which supports a display panel and a backlight unit of the display apparatus, and comprises a first sidewall;

a top member which overlaps a front surface of the display panel, and comprises a second sidewall, and a top portion which overlaps the front surface and extends from the second sidewall;

a bottom member which accommodates the display panel and the backlight unit, and comprises a bottom portion which faces a rear surface of the display panel, and a third sidewall which extends from the bottom portion;

a first coupling member which couples the frame member to the top member, the first coupling member comprising:

a first member directly on one of the first sidewall of the frame member and the second sidewall of the top member; and a second member directly on a remaining one of the first sidewall and the second sidewall, wherein the second member is engaged with the first member and couples the frame member to the top member; and a second coupling member which couples the top member to the bottom member, the second coupling member comprising:

a third member directly on one of the second sidewall of the top member and the third sidewall of the bottom member; and a fourth member directly on a remaining one of the second sidewall and the third sidewall, wherein the fourth member is engaged with the third member and couples the top member to the bottom member.

\* \* \* \* \*